US008433834B2

(12) United States Patent
Tavani

(10) Patent No.: US 8,433,834 B2
(45) Date of Patent: Apr. 30, 2013

(54) MANUFACTURING DEVICE AND MODULE FOR CONTROLLING INTEGRITY PROPERTIES OF A DATA STREAM INPUT INTO THE MANUFACTURING DEVICE

(75) Inventor: Ornella Tavani, Genoa (IT)

(73) Assignee: Siemens Aktiegesellschaft, Munich (DE)

( * ) Notice: Subject to any disclaimer, the term of this patent is extended or adjusted under 35 U.S.C. 154(b) by 779 days.

(21) Appl. No.: 12/256,790

(22) Filed: Oct. 23, 2008

(65) Prior Publication Data

US 2009/0106837 A1 Apr. 23, 2009

(30) Foreign Application Priority Data

Oct. 23, 2007 (EP) .................................... 07020681

(51) Int. Cl.
*G06F 3/00* (2006.01)
*G06F 5/00* (2006.01)
(52) U.S. Cl.
USPC ................. 710/55; 365/189.011; 365/189.16; 365/189.17; 709/230; 709/231; 709/232; 340/500; 340/511; 340/514; 340/516; 340/3.1; 726/16; 726/22; 710/7; 710/18; 710/20; 710/21; 710/15; 710/36; 370/241; 370/242
(58) Field of Classification Search ..................... 726/22
See application file for complete search history.

(56) References Cited

U.S. PATENT DOCUMENTS

| 4,897,662 | A | * | 1/1990 | Lee et al. | 343/701 |
|---|---|---|---|---|---|
| 5,940,299 | A | * | 8/1999 | Choi et al. | 700/121 |
| 2003/0217133 | A1 | | 11/2003 | Ostrup et al. | |
| 2005/0108631 | A1 | * | 5/2005 | Amorin et al. | 715/513 |

FOREIGN PATENT DOCUMENTS

CN 1553598 A 12/2004

\* cited by examiner

*Primary Examiner* — Nathan Flynn
*Assistant Examiner* — Bryan Wright
(74) *Attorney, Agent, or Firm* — Laurence A. Greenberg; Werner H. Stemer; Ralph E. Locher

(57) ABSTRACT

A module for controlling integrity properties of a data stream input into a device, such as a machine for manufacturing or a management system related to such machines. A plurality of control items are registered in a database. At least one activable control means executes a control of one integrity property according to one of several registered control items. A list is attached to the database with selectable links for activating at least one of the control means. Configuration means perform on at least one of the links a chronological selection according to a predefined management profile on integrity properties of the data stream in order to introduce a selectable relative time delay between activations of control items. Due to that configuration, the integrity control thus obtained is provided with high reliability as well as in a very flexible manner.

8 Claims, 1 Drawing Sheet

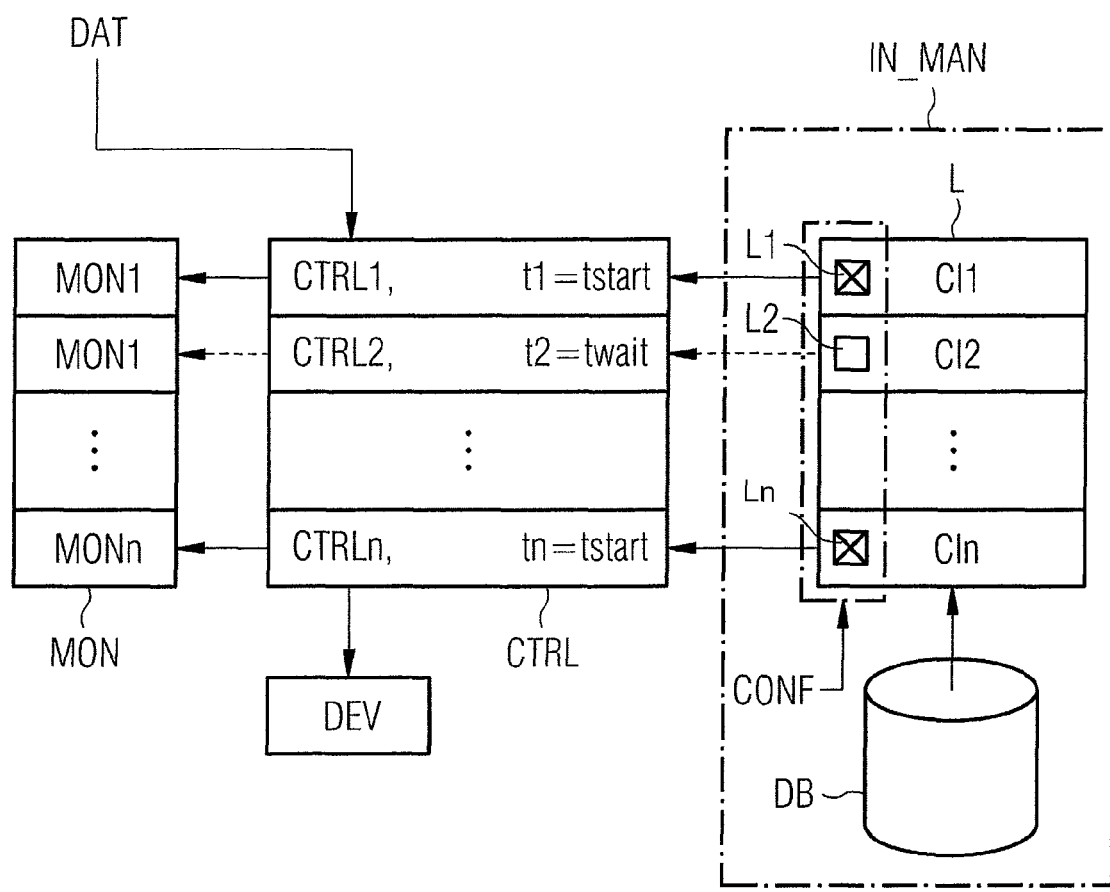

MANUFACTURING DEVICE AND MODULE FOR CONTROLLING INTEGRITY PROPERTIES OF A DATA STREAM INPUT INTO THE MANUFACTURING DEVICE

CROSS-REFERENCE TO RELATED APPLICATION

This application claims the priority, under 35 U.S.C. §119, of European patent application EP 07020681.8, filed Oct. 23, 2007; the prior application is herewith incorporated by reference in its entirety.

BACKGROUND OF THE INVENTION

Field of the Invention

The invention relates to a module for controlling the integrity properties of a data stream that is input into a device.

Especially in a system, for example a management system for manufacturing machines in a production or assembly line or for any processes, wherein a large amount of data is collected from external applications or interfaces of machines, there is a need to ensure a sufficient integrity (or soundness) of properties of these data in order to avoid fatal errors or lost of time. Integrity defects can arise from many sources of collapse, for example by a lack of or failed information in the data, by a failed synchronization of data streams, by a lost of a communication path for data stream, etc.

For checking the integrity of such collected data streams according to a well defined processing of these data two basic approaches are well known.

The first approach can be defined as a "strict" approach. There, if control means for said integrity of data detect a deficiency, these data are rejected. That means they are not considered or saved for further processing. Such a rejection can be compensated by means of a so called normalized database or key cross tables that evaluate/compensate constraints by a lack of integrity.

In many cases this "strict" approach is entirely satisfactory. In fact, in many cases, a missing data item can be easily retrieved and re-inserted so that attached operations over the system are not time critical, for example in case of typical office automation contests or typical customer management application, wherein somebody has to insert only relevant data related to a person missing in its database, but will have all the time to insert the person first and then complete other of his data latter, because these last data are not disturbing considerably a processing.

The "strict" approach is not always satisfactory, for example in case of a system for management of clinical registration, wherein many people are waiting in a queue before being "accepted" to a special medical care area. In that case, a lack of integrity in persons' data can present grave consequences. Another case concerns a logistics/manufacturing environment for which some runtime situations can be extremely critical, for example if a workflow in the logistical chain has to be stopped, because a usual identification code of a container to be loaded has unfortunately not been retrieved over a database of identification codes, so that the loading chain has to completely interrupted.

In other words the right approach depends on boundary conditions related to data models and to requirements of the system of management of these data.

Hence even a second "loose" approach by a lack of integrity (for example by omitting a missing data on a processed product) can also be an alternative to the "strict" approach, but can lead to some unpredicted risks that a system of management has not completely prevented before said lack of integrity happens. For example, it can be very complex for a production engineer to define and ensure a product definition by means of boundary conditions for raw materials if some of said raw materials are not yet available from a material depot and processes involving these raw materials are however going on.

SUMMARY OF THE INVENTION

It is accordingly an object of the invention to provide a module for controlling the integrity properties of a data stream which overcomes the above-mentioned disadvantages of the heretofore-known devices and methods of this general type and which module provides for a maximum in reliability.

With the foregoing and other objects in view there is provided, in accordance with the invention, a module for controlling integrity properties of a data stream input in a device, comprising:

a plurality of control items registered in a database;

at least one activatable control means configured to execute a control of one integrity property according to at least one of the registered control items;

a list connected to said database with selectable links for activating at least one of said control means; and configuration means connected to perform, on at least one of said selectable links, a chronologic selection according to a predefined management profile on integrity properties of the data stream in order to introduce a selectable relative time delay between activations of said control items.

In other words, the objects of the invention are achieved by providing a module for controlling integrity properties of one or more data streams that are input into a device such as a machine in a manufacturing process or a management system related to such machines. The module comprises:

a plurality of control items that are registered in a database, at least one activable control means that executes a control of one integrity property according to at least one of registered control items, a list attached to the database with selectable links for activating at least one of the control means, configuration means that perform on at least one of the links a chronologically selection according to a predefined management profile on integrity properties of the data stream in order to introduce a selectable relative time delay between activations of control items.

Each control item comprises a check order/command of an integrity property that is bounded to a possible critical point, for example based on a requirement of a manufacturing step in a production line. This critical point can be for example provided by use or by experience of a previous "strict" or "loose" approach but is managed/activated in a more reliable manner by means of said attached activable control means. This aspect provides a more flexible degree of freedom for the management of control items and hence more safety/security in terms of reliability for controlling the integrity properties of data related to each control item.

It is hence possible to generate specific lists of a critical point to be controlled in a selectable manner, preferably over a chronologically selection according to a predefined management profile on integrity properties of the data stream. By this way even if a high number of integrities has to be checked in a very complex management system, a sub-hierarchy of control items is easily and dynamically definable as relevant checkpoints in a very focused manner for a processing and allows a simple actualisable of control items for example if said system or its sub-systems are updated.

In other words the present invention increases the reliability for controlling integrity properties in terms of flexibility compared to a "strict" approach and in terms of selectivity compared to a "loose" approach.

One further advantageous aspect is provided by introducing variable relative time delays between activations of selected control means that "triggers" control items. This aspect allows to sharpen the control of integrities to be checked if delays are set to zero or short duration.

In the alternative, such a delay can be set on a higher or an infinite value, at least until a set of new latter selected control means are selected, so that a "permissible" lack of integrities can be regarded as acceptable during the delay. "Acceptable" means here as far as the lack of integrity does not affect a process in a negative way until the end of the delay.

In sum, according to reliability requirements the relative time delay follows a triple choice switching model depending if its value is set on zero (high required reliability), on a positive fixed amount (medium required reliability) or on an infinite value (low required reliability).

Especially by choosing a positive relative time delay it means that a control means will not be provided at a usual time of a typical control of the device in which a data stream is inputting. Without any interruption of data stream, an operator that controls the device as well as other possible processes from other devices can hence delay said control of the device at his convenience. This presents a great operating flexibility of control especially if a high number of interacting devices and related processes are running at same time intervals. Even if constructors of these devices recommend to check some items at defined processing time of said devices, the operator has the possibility over the module of the invention to rearrange a customized time schedule of activating these control items according to effective chronologically essential constraints on the integrity.

It can also be very advantageous to set a time delay on an infinite value for switching off selectively at least one of activatable control means, if for example for the management of a production line a newly intermediate maintenance operation or an updating of a subsystem has to be performed so that a selective part of possible control items and their related constraints can be chronologically actualized or completely modified. The configuration means of selective time delaying provide hence a very dynamically way for adapting the management of complex systems according to the invention.

In accordance with a concomitant feature of the invention, the configuration means are embedded in a software application, and the software application is resident in a computer device. The list, the database, and the selectable links are thereby editable and monitorable over an interactive user interface connected to the computer device.

Other features which are considered as characteristic for the invention are set forth in the appended claims.

Although the invention is illustrated and described herein as embodied in a module for controlling integrity properties of a data stream, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing.

BRIEF DESCRIPTION OF THE DRAWING

The FIGURE is a schematic overview of a module for controlling integrity properties of at least one data stream input in a device.

DETAILED DESCRIPTION OF INVENTION

Referring now to the sole FIGURE of the drawing in detail, there is presented a schematic overview of a possible module for controlling integrity properties of at least one data stream DAT inputted in a device DEV (for example a unit of a production line for a manufacturing process). The following elements are shown:
- a plurality n of control items CI1, CI2, . . . , CIn that are registered in a database DB;
- at least one activable control means CTRL1, CTRL2, . . . , CTRLn that executes a control of one integrity property at a data DAT input of a device DEV according to at least one of the registered control items CI1, CI2, . . . , CIn;
- a list L attached to the database DB with selectable links L1, L2, . . . , Ln for activating at least one of the control means CTRL (CTRL1, CTRL2, . . . , CTRLn); and
- configuration means CONF that perform on at least one of the links a chronological selection according to a predefined management profile IN_MAN on integrity properties of the data stream in order to introduce a selectable relative time delay twait between activations of control items.

According to the schematic illustration, the list L is connected to the database DB in order to extract some control items contained in the database DB. It is also possible to update the database DB with new added control items over the list L that is advantageously monitorable in an editable manner for a user responsible for the control of the integrity of data that are input into the device DEV.

In a preferred embodiment of the invention, each user selectable link L1, L2, . . . , Ln is encapsulated in a predefined management profile IN_MAN of a control process by means of a binary switch in front of a corresponding control item CI1, CI2, . . . , CIn of the list, ideally over a user interactive menu sheet on a monitoring device wherein binary switches are activable over buttons or software-based toggles. In the present example, both links L1, Ln for the control items CI1, CIn are activated in a same menu sheet of the management profile IN_MAN, that means without adding at a user side a relative time delaying between them for a procedure of control. A relative delay between these two control items can be however intrinsically defined from a device side. In contrast, the control item CI2 has not been actively selected, so that for the present menu sheet of the management profile IN_MAN this control items has been actively configured to be delayed in time relative to the two control items CI1, CIn.

Further configuration means in addition to the selectable links L1, L2, . . . , Ln are not represented in the drawing. They can comprise the values of time delays or other assertions or results' status for a specific control item that has to be delayed from a positive time amount relative to another one.

The control means CTRL comprising selectable control sub-means CTRL1, CTRL2, . . . , CTRLn, each one associated with a possible control item CI1, CI2, . . . , Cn, can be part of an input of the device DEV for the data stream DAT. The control means is therefore controlled from the management profile IN_MAN which is executed by the user or from an automatic command process. Each control item CI1, CI2, . . . , Cn provides hence an activation of at least one corresponding control means CTRL1, CTRL2, . . . , CTRLn at a selected start time tstart or defines a time delaying twait of said activation. In the present example, a first and second activation time t1, tn are set on tstart for the first control means CTRL1 and the last control means CTRLn as well as a third activation t2 is delayed in time with delay twait for the second control mans CTRL2 illustrated here.

Monitoring means MON1, MON2, . . . , MONn are connected to the control means CTRL1, CTRL2, . . . , CTRLn for monitoring possible assertions on integrity, such as for emitting an alarm on occasion of a lack of integrity. These monitoring means can also be embedded in the management profile sheet IN_MAN that works interactively with a user.

After passing the control means CTRL at the time tstart, the data stream DAT is input in the DEV that executes a further processing only if (according to the present example) both first and last control means CTRL1 and CTRLn are not signalling a lack of integrity at the same time tstart and even if the second control means CTRL2 signals a lack of integrity during the relative time interval [twait-tstart].

According to this example the time delay twait can be set to a infinite value for switching off selectively at the activable control means CTRL2. This can be advantageous if the corresponding control item CI2 has no more relevance in terms of integrity because the manufacturing process has been modified so that the control item CI2 is permanently secured or is no longer to be considered at this step of the manufacturing process.

Configuration means CONF performs the chronologically selection/activation of the control means CTRL1, CTRL2, . . . , CTRLn by means of at least one logical assertion on a predefined number of selectable links L1, L2, . . . , Ln. The activable control means CTRL1, CTRL2, . . . , CTRLn which are connected to monitoring means MON1, MON2, . . . , MONn emit a positive or negative output signal (binary signal TRUE/FALSE) if a full integrity of data over the selected logical assertion is monitored at a present time tstart or not.

In a preferred embodiment of the invention, a plurality of logical assertions with a different set of selected links L1, L2, . . . , Ln are pre-definable in order to be monitored over successive time delays. In other words, a certain kind of integrity can be advantageously detected by means of putting one or more time delays on one or more selected links L1, L2, . . . , Ln. This approach consists in providing a plurality of sub-profiles of a main management profile IN_MAN using a plurality of chronologically delayed masks of links for defining a strategy of controlling specific integrity properties.

In a preferred embodiment of the invention, the module for controlling integrity properties of at least a data stream DAT input into a device DEV can be realized as an input/output interface of the device DEV with an output of passing data stream DAT and an input for said data stream DAT as well as for the command signals from the list L and associated links to the control means CTRL.

Another form of module parts can be realized as a software platform wherein:
the configuration means CONF for defining/selecting schedule of activation for the links L are embedded in a software application like a menu with selectable toggles of parameters;
the list L, the database DB and the selectable links L1, L2, . . . , Ln are edit-able and monitor-able over am interactive user interface.

The entire module can be also embedded in a software platform on which the data stream is input and alarms from the software control means CTRL or their software monitoring means MON1, MON2, . . . , MONn output signals that permit or block some further processes whose integrity's requirements are or are not ensured at a certain time.

The invention claimed is:

1. A system comprising:
a manufacturing device and a control module having a processor for controlling integrity properties of a data stream input into the manufacturing device;
the control module including:
a database storing a plurality of control items;
activatable control means configured to execute a control of a plurality of integrity properties according to the plurality of control items;
a list connected to said database with selectable links for activating specific ones of a plurality of sub-control means of said activatable control means; and
configuration means connected to perform, on at least one of said selectable links, a chronologic selection according to a predefined management profile on integrity properties of the data stream in order to introduce a selectable relative time delay between activations of different ones of said plurality of control items;
said control means outputting the data stream to said manufacturing device.

2. The system according to claim 1, wherein said control module comprises a time delay for switching off selectively at least one of said plurality of sub-control means of said activatable control means.

3. The system according to claim 1, wherein said control module includes said configuration means is set to perform the chronological selection by way of a logical assertion on a predefined number of selectable links.

4. The system according to claim 2, wherein said activable control means are connected to monitoring means with a positive output signal if a full integrity of data over the selected logical assertion is monitored at a given time.

5. The system according to claim 4, wherein a plurality of logical assertions with a different set of selected links are pre-definable in order to be monitored over successive time delays.

6. The system according to claim 1, wherein said control module includes a software application stored on a non-transitory computer readable medium for configuring the system; and said software application is resident in a computer device and said list, said database, and said selectable links are editable and monitorable over an interactive user interface connected to said computer device.

7. The system according to claim 1, wherein said control module is a hardware device.

8. The system according to claim 1, wherein said control module is realized in a software platform stored on a non-transitory computer readable medium.

* * * * *